June 5, 1928.

W. L. HAKE

POULTRY FEEDER

Filed Jan. 27, 1927

William L. Hake, INVENTOR

BY Victor J. Evans, ATTORNEY

June 5, 1928.

W. L. HAKE

POULTRY FEEDER

Filed Jan. 27, 1927

William L. Hake
INVENTOR

BY Victor J. Evans
ATTORNEY

June 5, 1928.
W. L. HAKE
POULTRY FEEDER
Filed Jan. 27, 1927
1,672,211
5 Sheets-Sheet 3
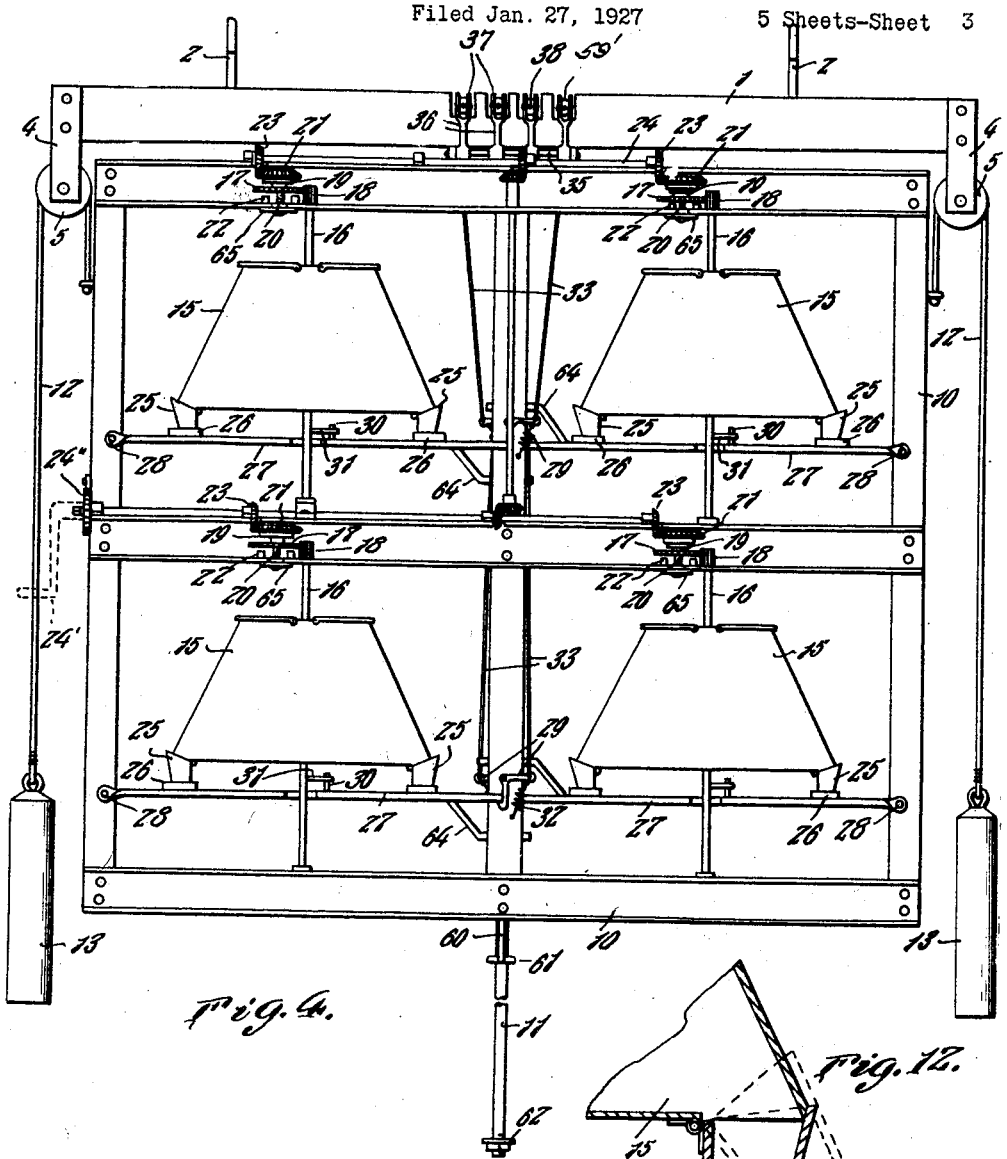
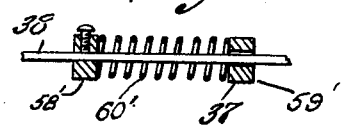
William L. Hake
INVENTOR
BY Victor J. Evans
ATTORNEY June 5, 1928.

W. L. HAKE 1,672,211

POULTRY FEEDER

Filed Jan. 27, 1927 5 Sheets-Sheet 4

William L. Hake
INVENTOR

BY Victor J. Evans
ATTORNEY

June 5, 1928.
W. L. HAKE
1,672,211
POULTRY FEEDER
Filed Jan. 27, 1927     5 Sheets-Sheet 5
Fig. 9.
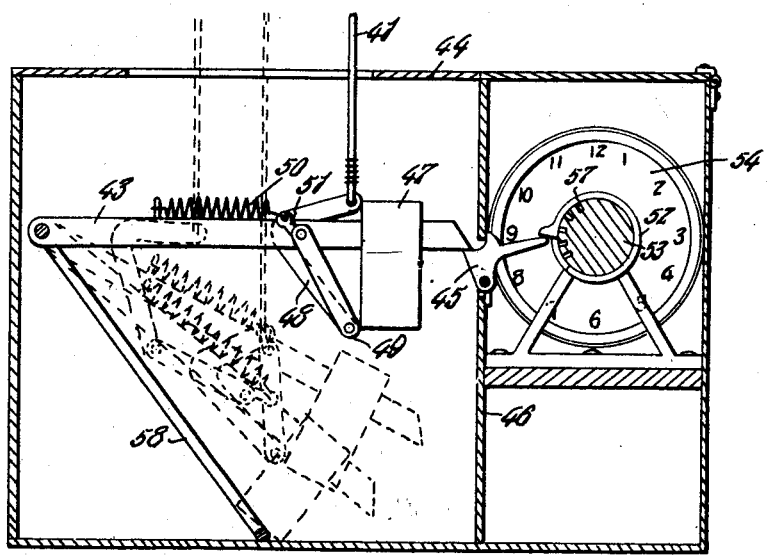
Fig. 10.
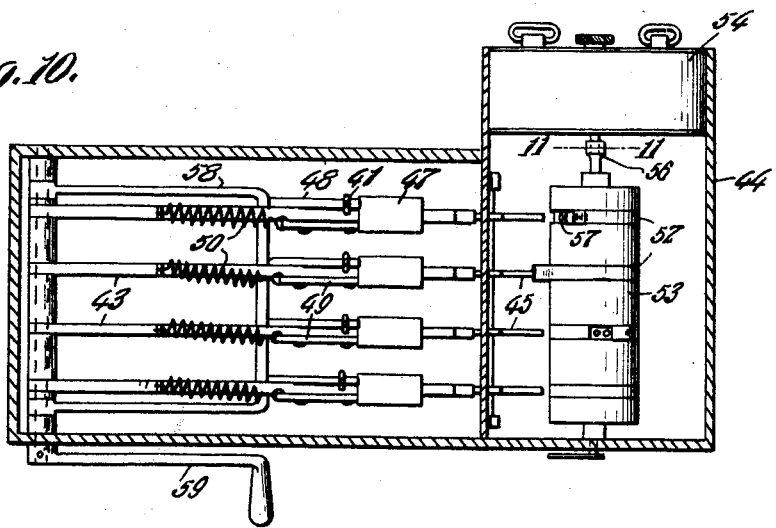
Fig. 11.
William L. Hake
INVENTOR
BY Victor J. Evans
ATTORNEY Patented June 5, 1928.

1,672,211

UNITED STATES PATENT OFFICE.

WILLIAM L. HAKE, OF MIDLAND, MICHIGAN.

POULTRY FEEDER.

Application filed January 27, 1927. Serial No. 164,046.

This invention relates to poultry feeders, and has for its chief characteristic the provision of a plurality of hoppers mounted for independent rotation, and actuated by time controlled mechanism, so that the hoppers can be called into use at different predetermined intervals, each hopper being constructed to uniformly distribute the feed about the place in which the apparatus is installed.

Another object of the invention resides in the provision of a vertically slidable frame on which the hoppers are mounted, the frame being normally supported in an elevated position, and capable of being easily and conveniently lowered, and held in its lowered position so that the various hoppers can be filled as the occasion may require.

In carrying out the invention I contemplate the use of means for normally closing the outlets of each hopper and holding the latter against rotation, the means including a time controlled element which operates to release the hopper and also uncover the outlet openings.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a view showing the opposite side of the parts shown in Figure 3.

Figure 9 is a vertical sectional view through the clock operated means.

Figure 10 is a horizontal sectional view through Figure 9.

Figure 11 is a section on line 11—11 of Figure 10.

Figure 12 is a fragmentary sectional view through one of the hoppers and its spout and the pan for closing the end of the spout.

Figure 13 is a fragmentary view of one of the operating cables and the means associated therewith for releasing a hopper for operation.

Figure 1:
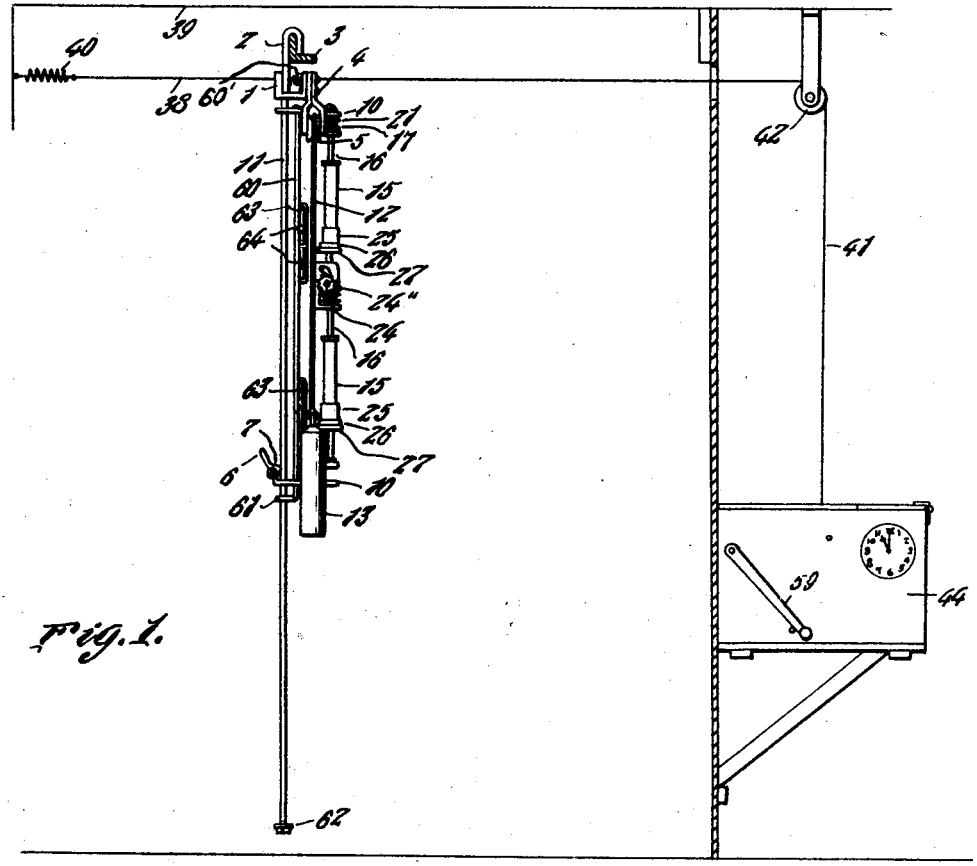
Figure 1 is a view showing the entire device arranged in a hen house.
Figure 2:
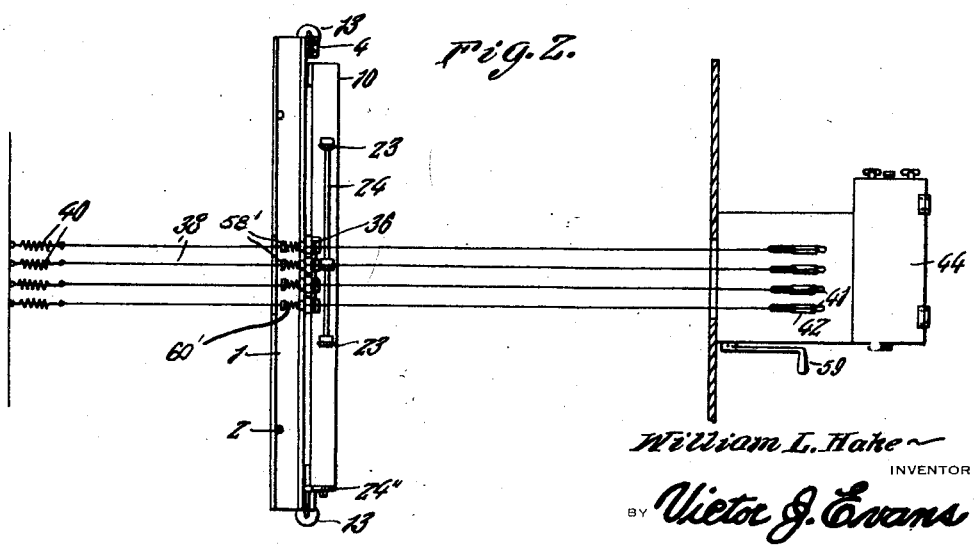
Figure 2 is a plan view of Figure 1.

In these drawings, 1 indicates a supporting beam which is provided with the hooks 2 for engaging a beam 3 in the hen house or other building, the beam 1 being provided with the hangers 4 which carry the pulleys 5. The hopper carrying frame 10 is slidably mounted on the vertically arranged bar or standard 11 which depends from the center of the beam 1 and cables 12 are attached to the frame 10 and pass over the pulleys 5 and have weights 13 attached to their other ends, these weights tending to hold the frame 10 in elevated position, as shown in Figures 1, 3, 4 and 5. This arrangement permits the frame to be pulled downwardly upon the standard 11 so that the hoppers can be refilled and the frame is held in lowered position by means of the handle 6 pivoted to the lower part of the frame 10 and having a cam 7 for gripping the standard 11 to clamp the frame to the standard and thus hold it in lowered position. When the handle is depressed to free its cam from the standard, the weights will return the hopper frame to raised position.

Figure 6:
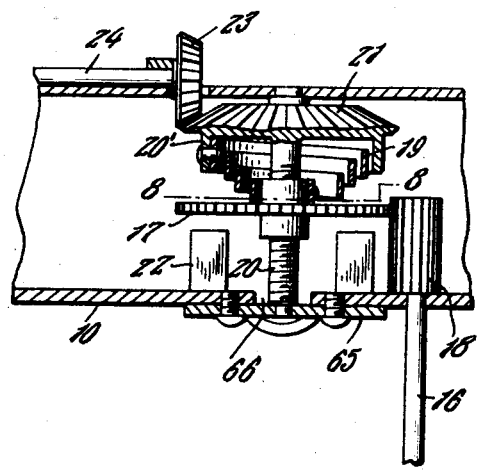
Figure 6 is a detail sectional view of the spring motor and its associated parts.
Figure 7:
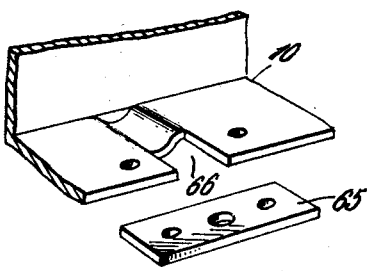
Figure 7 is a fragmentary view showing the removable means for supporting the lower end of the spring shaft.
Figure 8:
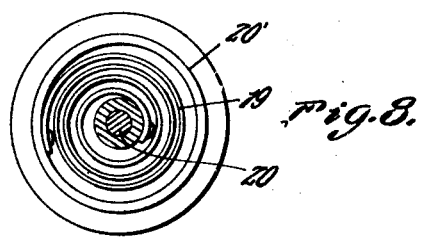
Figure 8 is a section on line 8—8 of Figure 6.

The frame 10 supports a plurality of hoppers 15, which may be arranged in any suitable manner upon the frame, preferably in the manner illustrated in the drawings. These hoppers are mounted for independent rotation, each being keyed or otherwise secured to a shaft 16 journaled on the frame and adapted to be rotated through the instrumentality of a spring actuated gear 17 which meshes with a pinion 18 associated with the shaft 16. The spring is indicated at 19 in Figures 6 and 8. The gear 17 has its hub mounted on a threaded part of a shaft 20 and said shaft carries a gear 21. One end of the spring 19 is connected with the hub and the other end is connected with a flange of the gear 21 so that as the shaft is rotated by the gear, the spring will be wound up and as the gear 17 is held stationary by its engagement with the pinion 18, the rotating shaft will cause the gear to move upwardly upon the shaft off the friction blocks 22. The stationary gear 17 also holds one end of the spring stationary so that the spring is wound up. When the shaft 16 is released, the stored energy in the spring will rotate the gear 17 on the shaft 20 which is now stationary and thus the gear 17 will rotate the shaft 16 through means of the pinion 18 until the said gear 17 comes into engagement with the friction blocks 22, when further movement will be prevented. Each gear 21 is engaged by a gear 23 on a shaft 24, these shafts being connected together by other shafts and gearing and one of the shafts 24 is adapted to be rotated manually by a crank handle 24', this shaft being provided with the ratchet mechanism 24'' to prevent retrograde movement.

Each hopper may vary in size and configuration without departing from the spirit of the invention, but each preferably embodies a plurality of pivotally mounted outlet spouts 25 arranged at the corners of the hopper. These spouts are normally arranged vertically, as clearly shown in Figure 12, but when the hopper is being rotated, the spouts are swung outwardly by centrifugal force, and thereby occupy a horizontal position, or substantially so, with a view of uniformly distributing the contents of the hopper over a large area of the enclosure in which the apparatus is installed.

Figure 3:
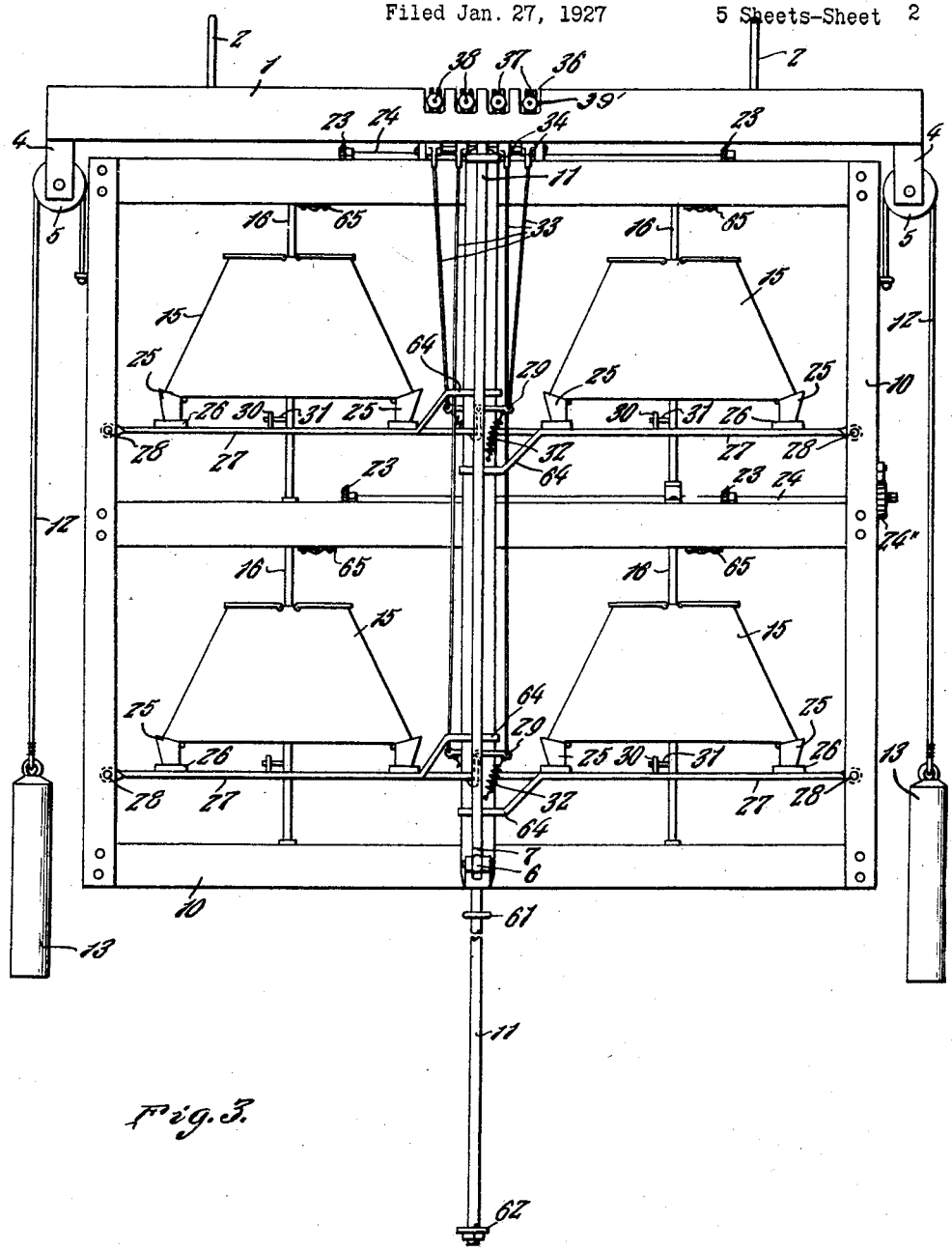
Figure 3 is an enlarged elevation of the supporting frame and the sliding frame with their associated parts.

The spouts 25 of each hopper are normally closed or sealed by cups 26 carried by a bar 27, there being one of these bars pivoted on the frame 10 for each hooper 15, and arranged as clearly shown in Figures 3 and 4. These bars are pivoted as at 28, and have their free ends normally engaged by pivoted hooks 29 which support the bars in the position shown in Figure 4. Rising from each bar 27 is a lug 30 which engages a pin 31 projecting horizontally from the shaft 16 of the adjacent hopper, which arrangement holds the hopper and shaft against rotation by the spring 19, so that the bar 27 is not only utilized for the last mentioned purpose, but is also employed to seal or close the outlet spouts 25 of the adjacent hopper, as above described. Each hook-like element 29 is maintained in its active position by means of a coiled spring 32, while each hook-like element 29 is connected to the adjacent end of one of the cables 33, there being one of these cables for each bar 27. The upper end of each cable 33 is connected to one end 34 of a bell crank lever pivoted on the frame as at 35, while the other end or branch 36 of this lever is forked as at 37, for a purpose to be presently described. This construction is more clearly illustrated in Figures 4 and 5.

The forked extremities 37 of the various bell crank levers each straddle a cable 38 which is arranged parallel with and adjacent the ceiling 39 of the enclosure, as clearly shown in Figure 1. Each cable 38 has one end connected with a coiled spring 40, for a purpose to be hereinafter described, while the other end portion 41 of this cable is trained over a pulley 42 and is connected with a lever 43 operating within a housing 44, all of which form a part of a time controlled mechanism for operating the hoppers in the manner to be presently described. Again, there is one of these levers 43 for each cable 38, the lever being pivoted at one end in the housing 44 while the other end is adapted to engage a pivoted latch member 45 pivoted in an opening in the partition 46 in the said housing. A weight 47 is carried by each lever 43 so that the lever will drop as soon as it is freed of the latch member 45. Each lever carries a bell crank 48 which is connected with the lever by a link 49 and a spring 50 has one end connected with the lever 43 and its other end with a small extension 51 on the end of the link 49 which is pivoted to the lever. The cable 38 is fastened to the free end of the bell crank. Thus as the lever falls under the action of its weight, the bell crank will be caused to pull upon the cable 38, but as the lever moves downwardly the relative position of the parts will be changed until finally the bell crank will move upwardly and away from the weight carrying the link 49 against the lever 43 and stretch the spring 50 and thus release the strain on the cable 38 as the parts assume the dotted line position in Figure 9. Each latch member 45 is operated by a projection on a split band 52 adjustably mounted in a groove in a drum 53 which is rotated from the clock mechanism 54 through means of the clutch 56. Each band is adjustably arranged in this groove by means of a pin thereon engaging any one of a plurality of holes 57 formed in the bottom of the groove. As will be seen, as the projection on the band engages the tail of the latch member 45, it will rock said member on its pivot and thus cause the member to disengage the lever 43 so that said lever can rock and thus pull upon the cable 38. The cable 38 is thus pulled against the tension of its spring 40, and as the cable moves in this direction the collar 58' carried by said cable moves the collar 59' loosely mounted thereon, into engagement with the adjacent forked extremity 37 of one of the bell crank levers above referred to. A coiled spring 60' surrounds each cable 38 and provides an operative connection between the fixed collar 58' and the sliding collar 59'. Therefore as the collar 59 is moved into engagement with the adjacent bell crank lever, the latter is rocked upon its pivot 35, exerting a pull upon the adjacent cable 33, releasing the particular bar 27 from the hook-like element or catch 29. When the bar 27 of the particular hopper is released, the said bar gravitates upon its pivot 28, thereby uncovering the discharge spouts 25 and at the same time releasing the shaft 16 of the hopper 15 for rotation. Immediately the spring 19 functions to rotate said shaft and hopper, and it is during the rotation of the latter that the discharge spouts 25 are influenced by centrifugal force and swung outwardly to distribute the contents of the hopper over a large area. It might here be stated that adjacent each band 52 the drum 53 is provided with indicia so that the band can be arranged to operate the adjacent latch 45 at any desired time of the day or night. The levers 43 are moved to raised position where they will be engaged by the latch members 45 by means of a yoke 58 arranged in the housing and operated from a crank handle 59 which is located outside of the housing and which is connected with the yoke.

Figure 5:
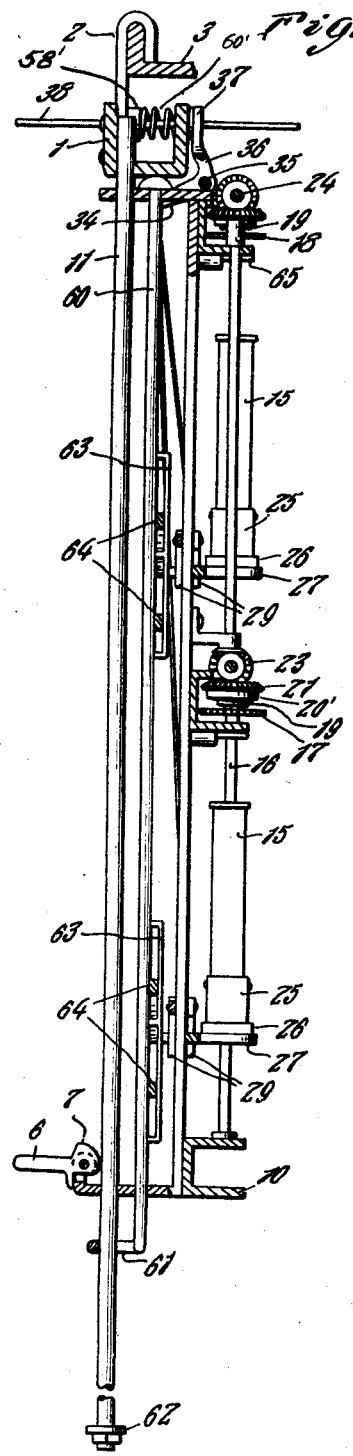
Figure 5 is a vertical sectional view through Figure 3.

After all of the hoppers have been emptied, the frame 10 is pulled down to its lowest position and held in said position by the locking handle 6 so that the hoppers can be refilled. As the frame 10 moves downwardly, a vertically arranged rod 60 in said frame will have its eye 61 which encircles the standard 11, engage a washer and nut 62 at the lower end of the standard so that said rod 60 will be moved upwardly, which will cause the lower portions of the guides 63 on said rod to act against the offset ends 64 of the bars 27 and thus raise the said bars to a position where they will be engaged by the latches 29 so that said bars will again act to hold the hoppers against rotation and will cause the pans 26 to close the ends of the spouts 25. When the frame 10 moves upwardly again under the action of its weights, the upper end of the rod 60 will strike the beam 1 so that it will be returned to its normal position, as shown in Figure 5. The springs 19 are rewound by turning the crank 24', as before explained. The hoppers are then ready to be again operated by the clock mechanism.

In order to permit each shaft 20 and its associated parts to be removed for repair or other purposes, I provide a bearing plate 65 for the lower end of each shaft, this plate being detachably connected with that part of the frame adjacent the shaft, said part being cut away, as at 66, so that when the plate is removed the parts can be lifted out.

The apparatus is so constructed and designed that after it is once set it does not require any further attention until after all of the hoppers have been emptied, and that these hoppers are actuated and controlled by time mechanism so that they can be independently called into use at any predetermined hour or minute of the day or night. It is, of course, to be understood that the apparatus can be constructed to accommodate any number of hoppers 15, and that the time actuated drum will be provided with a sufficient number of grooves and bands consistent with the number of hoppers employed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A feeder of the class described comprising a support, a hopper thereon, means for rotating the hopper, an outlet spout pivotally connected with the hopper and normally depending therefrom and adapted to be swung outwardly to a position inclined to the vertical incident to the rotation of the hopper.

2. A feeder of the class described comprising a support, a hopper thereon, means for rotating the hopper, an outlet spout pivotally connected with the hopper and normally depending therefrom and adapted to be swung outwardly to a position inclined to the vertical incident to the rotation of the hopper and means for closing the spout and holding the hopper against rotation.

3. A poultry feeder comprising a frame, a hopper rotatably mounted in the frame, a spring motor for rotating the hopper, an outlet spout pivoted to the hopper and normally depending therefrom but adapted to be swung outwardly to a position inclined to the vertical incident to the rotation of the hopper and a latch member for holding the hopper against rotary movement and having a part for closing the spout.

4. A feeder of the class described comprising a vertically movable frame, means for supporting the same, a plurality of hoppers supported on the frame, means for rotating the hoppers, a latch member for each hopper for holding the same against rotation and for closing the outlet of the hopper, means for releasing the latch members individually and means for simultaneously moving the latch members to latching position.

5. A feeder of the class described comprising a vertically movable frame, means for supporting the same, a plurality of hoppers supported on the frame, means for rotating the hoppers, a latch member for each hopper for holding the same against rotation and for closing the outlet of the hopper, means for releasing the latch members individually and means operated by the downward movement of the frame for simultaneously returning the latch members to latching position.

6. A poultry feeder comprising a plurality of hoppers, spring means for rotating each hopper, latch means for preventing rotation of each hopper, means for releasing the latch means individually and manually operated means for simultaneously rewinding the spring means.

7. A poultry feeder comprising a frame, a plurality of hoppers supported thereon for independent rotation, each hopper having outlet openings, means for rotating each hopper, and means for normally closing said openings and holding the hopper against rotation.

8. A poultry feeder comprising a frame, a plurality of hoppers supported thereon for independent rotation, means for rotating each hopper, each hopper including pivotally mounted outlet spouts normally depending therefrom and adapted to be swung outwardly to a position inclined to the vertical incident to the rotation of the hopper and means for normally holding each hopper against rotation and releasing each hopper for operation.

9. A poultry feeder comprising a frame mounted for sliding movement, a plurality of hoppers supported thereon for independent rotation, means for normally holding the frame in an elevated position, means for normally holding the hoppers against rotation, means for releasing each hopper for rotation and means for holding the frame in a lowered position while the hoppers are being refilled.

10. A poultry feeder comprising a frame, a plurality of hoppers supported thereon for independent rotation, means for rotating each hopper, each hopper having outlet spouts depending therefrom, a bar pivoted beneath each hopper and constructed to normally close said spouts, means carried by said bar for holding the hopper against rotation, a trip element normally engaging the free end of said bar for holding the latter in its active position and means for releasing each bar to permit rotation of the hopper.

11. A poultry feeder comprising a frame, a plurality of hoppers supported thereon for independent rotation, means for rotating each hopper, means for normally holding the hopper against rotation and including a bar pivoted beneath the hopper, outlet spouts depending from the hopper and normally closed by said bar, pivoted elements designed to cooperate with the free ends of said bars for normally holding the latter in active position, a bell crank lever for each pivoted element, a cable connecting each element and bell crank lever, means for tripping said elements to release said hopper and including cables trained through said bell crank levers and means carried by each cable for actuating the adjacent bell crank lever for the purpose specified.

In testimony whereof I affix my signature.

WILLIAM L. HAKE.